US012625684B2

(12) United States Patent
Lin et al.

(10) Patent No.: US 12,625,684 B2
(45) Date of Patent: May 12, 2026

(54) AUTOMATIC REAL USER MONITORING (RUM) INSTRUMENTATION

(71) Applicant: MICRO FOCUS LLC, Santa Clara, CA (US)

(72) Inventors: Yu-Dan Lin, Shanghai (CN); Bing Zhang, Shanghai (CN); Hao Liu, Shanghai (CN); Jin-Hong Zhang, Shanghai (CN)

(73) Assignee: Micro Focus LLC, Santa Clara, CA (US)

( * ) Notice: Subject to any disclaimer, the term of this patent is extended or adjusted under 35 U.S.C. 154(b) by 197 days.

(21) Appl. No.: 18/378,600

(22) Filed: Oct. 10, 2023

(65) Prior Publication Data

US 2025/0117200 A1 Apr. 10, 2025

(51) Int. Cl.
*G06F 8/41* (2018.01)
(52) U.S. Cl.
CPC ...................................... *G06F 8/41* (2013.01)
(58) Field of Classification Search
CPC ............................................................. G06F 8/41
USPC ................................................. 717/120–145
See application file for complete search history.

(56) References Cited

U.S. PATENT DOCUMENTS

| | | | | | |
|---|---|---|---|---|---|
| 6,345,384 | B1 * | 2/2002 | Sato | ........................... | G06F 8/47 |
| | | | | | 717/160 |
| 9,727,317 | B2 * | 8/2017 | Gao | ........................ | G06F 8/443 |

| | | | | | |
|---|---|---|---|---|---|
| 10,133,557 | B1 * | 11/2018 | Tripathi | .................. | G06F 1/329 |
| 10,223,526 | B2 * | 3/2019 | Xuan | ........................ | G06F 21/54 |
| 10,956,137 | B2 * | 3/2021 | Waltenberg | ............... | G06F 8/71 |
| 11,157,250 | B2 * | 10/2021 | Bucuvalas | .............. | G06F 8/443 |
| 11,288,177 | B2 * | 3/2022 | Balakrishnan | ...... | G06F 11/3688 |
| 11,321,080 | B2 * | 5/2022 | Ren | ........................... | G06F 8/53 |
| 12,019,749 | B2 * | 6/2024 | Yerra | ........................ | G06F 8/75 |
| 12,197,571 | B2 * | 1/2025 | Wildsmith | ............... | G06F 8/34 |
| 2015/0378864 | A1 * | 12/2015 | Lensmar | ............ | G06F 9/45508 |
| | | | | | 717/130 |
| 2020/0226232 | A1 * | 7/2020 | Gagnerot | .................. | G06F 8/76 |

OTHER PUBLICATIONS

Cho et al, "DexMonitor: Dynamically Analyzing and Monitoring Obfuscated Android Applications", IEEE, pp. 1-12 (Year: 2018).*

(Continued)

*Primary Examiner* — Anil Khatri
(74) *Attorney, Agent, or Firm* — Sheridan Ross P.C.

(57) ABSTRACT

Systems and methods are disclosed to develop and use a tool to enable an application package to be instrumented with automatic real user monitoring (RUM) without accessing the original source code. A package, such as Android application bundle (AAB) or Android package kit (APK), is imported and decoded and a generated source code file and/or manifest is obtained. Instrumentation is then added at a location corresponding to a code signature in the generated source code file (e.g., an operation to be instrumented before and/or after the operation). The generated source code file is then compiled and packaged into an APK and/or AAB file. The resulting application package is available for downloading, installation, and use on user devices with the instrumentation having been automatically added and without access to the original source code.

20 Claims, 15 Drawing Sheets

(56) References Cited

OTHER PUBLICATIONS

Avila et al, "Evaluating Dalvik Instructions Through Dynamic Analysis of Bytecodes", IEEE, pp. 1 (Year: 2012).*

Xu et al, "Copy-and-patch compilation: a fast compilation algorithm for high-level languages and bytecode", ACM, pp. 1-31 (Year: 2021).*

Bartel et al, "Dexpler: converting Android Dalvik bytecode to Jimple for static analysis with Soot", ACM, pp. 1-13 (Year: 2012).*

Burcur et al, "Parallel symbolic execution for automated real-world soware testing", ACM, pp. 1-16 (Year: 2011).*

\* cited by examiner

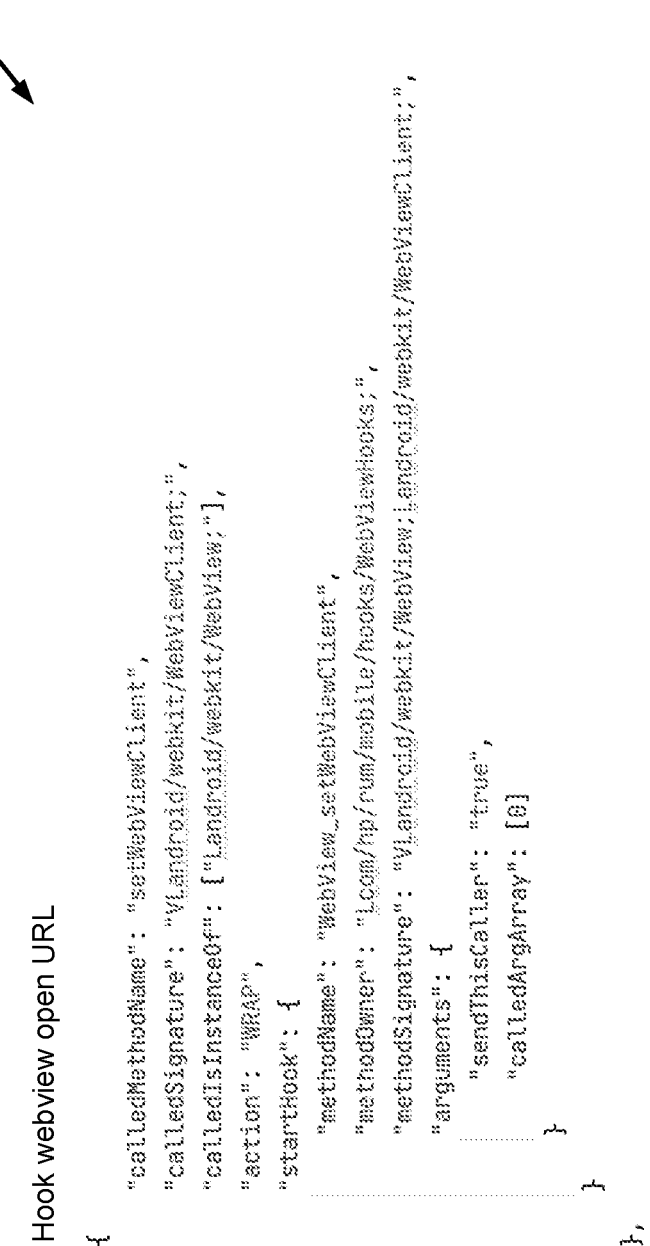

```
Hook webview open URL

{
    "calledMethodName": "setWebViewClient",
    "calledSignature": "VLandroid/webkit/WebViewClient;",
    "calledIsInstanceOf": ["Landroid/webkit/WebView;"],
    "action": "WRAP",
    "startHook": {
        "methodName": "WebView_setWebViewClient",
        "methodOwner": "Lcom/hp/rum/mobile/hooks/WebViewHooks;",
        "methodSignature": "VLandroid/webkit/WebView;Landroid/webkit/WebViewClient;",
        "arguments": {
            "sendThisCaller": "true",
            "calledArgArray": [0]
        }
    }
}
```

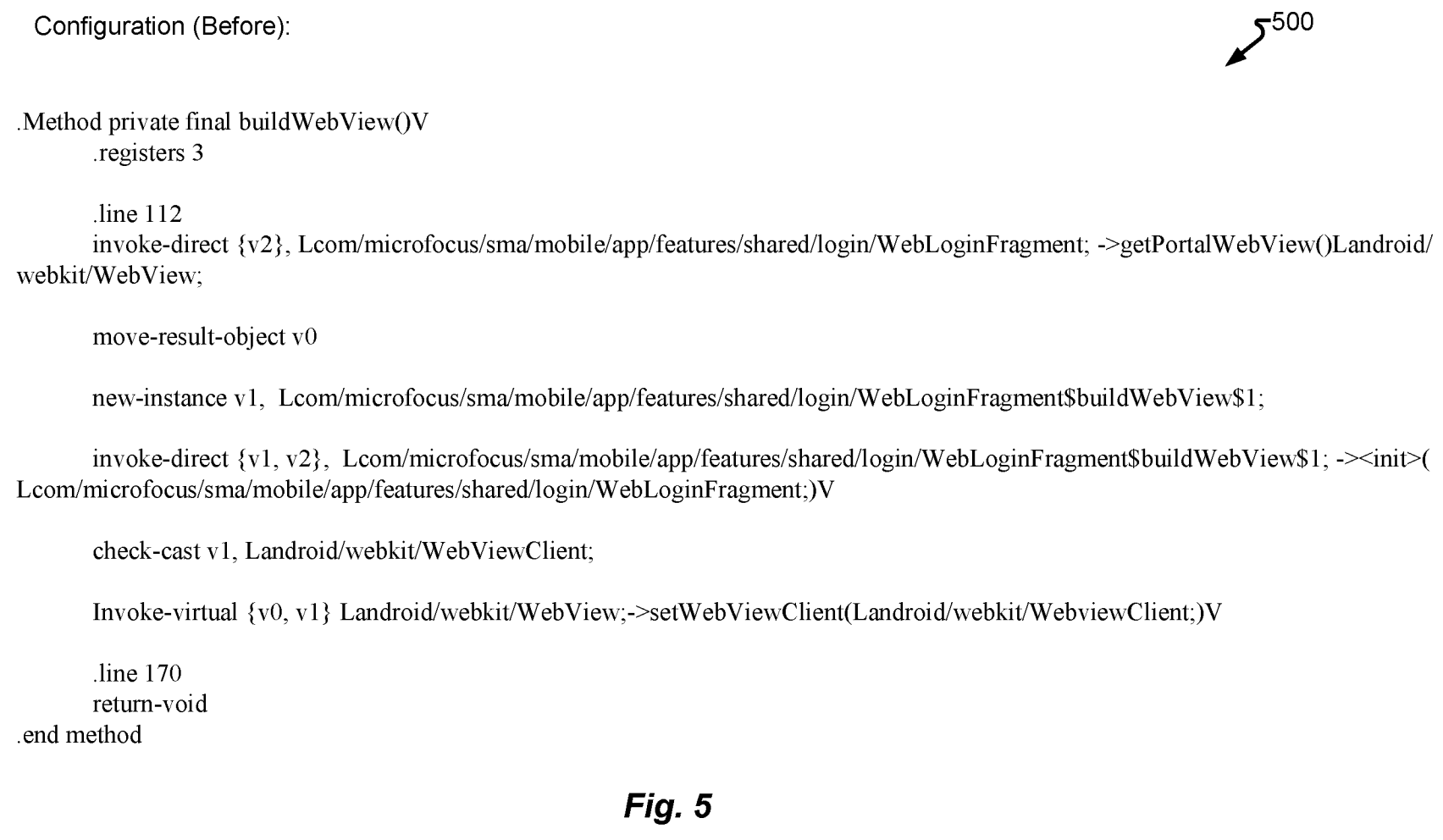

Configuration (Before):

.Method private final buildWebView()V
.registers 3

.line 112
invoke-direct {v2}, Lcom/microfocus/sma/mobile/app/features/shared/login/WebLoginFragment; ->getPortalWebView()Landroid/webkit/WebView;

move-result-object v0 new-instance v1, Lcom/microfocus/sma/mobile/app/features/shared/login/WebLoginFragment$buildWebView$1;

invoke-direct {v1, v2}, Lcom/microfocus/sma/mobile/app/features/shared/login/WebLoginFragment$buildWebView$1; ->‹init›(Lcom/microfocus/sma/mobile/app/features/shared/login/WebLoginFragment;)V check-cast v1, Landroid/webkit/WebViewClient;

Invoke-virtual {v0, v1} Landroid/webkit/WebView;->setWebViewClient(Landroid/webkit/WebviewClient;)V .line 170
return-void
.end method

Fig. 5

Figure 6:
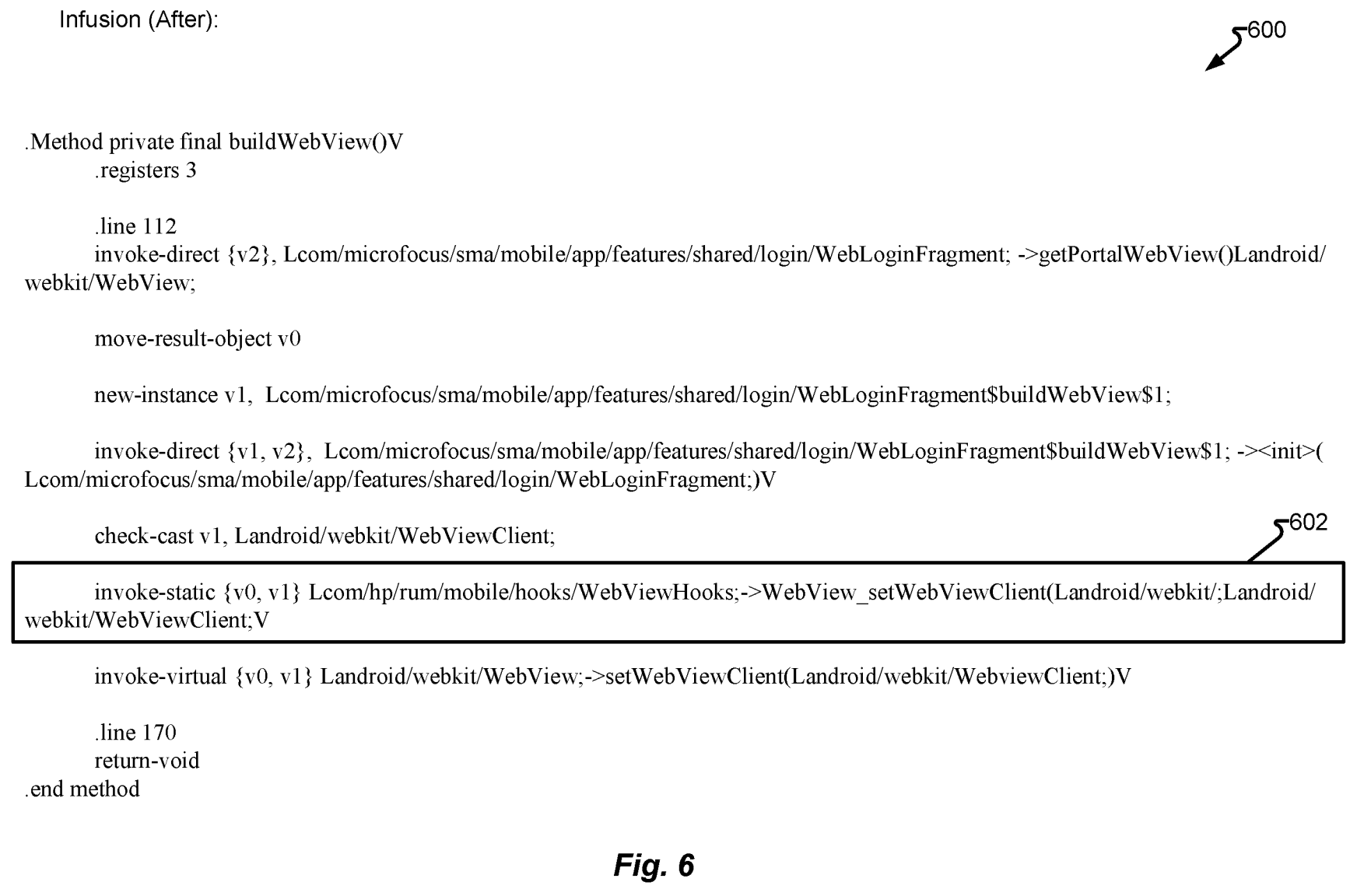

Infusion (After):

.Method private final buildWebView()V
　.registers 3

.line 112
　invoke-direct {v2}, Lcom/microfocus/sma/mobile/app/features/shared/login/WebLoginFragment; ->getPortalWebView()Landroid/
webkit/WebView;

move-result-object v0 new-instance v1, Lcom/microfocus/sma/mobile/app/features/shared/login/WebLoginFragment$buildWebView$1;

invoke-direct {v1, v2}, Lcom/microfocus/sma/mobile/app/features/shared/login/WebLoginFragment$buildWebView$1; -><init>(
Lcom/microfocus/sma/mobile/app/features/shared/login/WebLoginFragment;)V check-cast v1, Landroid/webkit/WebViewClient;

invoke-static {v0, v1} Lcom/hp/rum/mobile/hooks/WebViewHooks;->WebView_setWebViewClient(Landroid/webkit/;Landroid/
webkit/WebViewClient;V invoke-virtual {v0, v1} Landroid/webkit/WebView;->setWebViewClient(Landroid/webkit/WebviewClient;)V .line 170
　return-void
.end method

Hook rest call:

```
{
    "calledMethodName": "build",
    "calledSignature": "Lokhttp3/OkHttpClient;",
    "calledIsInstanceOf": ["Lokhttp3/OkHttpClient$Builder;"],
    "opCodesToExclude": [111, 117],
    "action": "WRAP",
    "startHook": {
        "methodName": "handleOkHttpClientBuilderBuild",
        "methodOwner": "Lcom/hp/rum/mobile/hooks/OkHttpNetworkHooks;",
        "methodSignature": "VLjava/lang/Object;",
        "arguments": {
            "sendThisCaller": "true"
        }
    }
}
```

Before infusion:

```
.method private final buildOkHttpClient(Lcom/android/volley/Request;)Lokhttp3/OkHttpClient;
    .registers 3
    .param p1, "reqeust"    # Lcom/android/volley/Request
    .annotation system Ldalvik/annotation/Signature;
        value = {
            "(",
            "Lcom/android/volley/Request<",
            "*>;)",
            "Lokhttp3/OkHttpClient;"
        }
    .end annotation .line 60
    invoke-virtual {v1, v2}, Lcom/microfocus/sma/mobile/app/infra/restclient/OkHttpStack;->buildOkHttpBuilder(Lcom/android/volley/Request;)Lokhttp3/OkhttpClient$Builder;

move-result-object v0 invoke-virtual {v0}, Lokhttp3/OkhttpClient$Builder;->build()Lokhttp3/OkhttpClient;

move-result-object v0 return-object v0
.end method
```

*Fig. 8*

```
.method private final buildOkHttpClient(Lcom/android/volley/Request;)Lokhttp3/OkHttpClient;
    .registers 3

.param p1, "reqeust"    # Lcom/android/volley/Request
    .annotation system Ldalvik/annotation/Signature;
        value = {
            "(",
            "Lcom/android/volley/Request<",
            "*>;)",
            "Lokhttp3/OkHttpClient;"
        }
    .end annotation .line 60
    invoke-virtual {v1, v2}, Lcom/microfocus/sma/mobile/app/infra/restclient/OkHttpStack;->buildOkHttpBuilder(Lcom/
android/volley/Request;)Lokhttp3/OkhttpClient$Builder;

move-result-object v0 invoke-static {v0}, Lcom/hp/rum/mobile/hooks/OkHttpNetworkHooks;->handleOkHttpClientBuilderBuild(Ljava/lang/
Ojbect;)V invoke-virtual {v0}, Lokhttp3/OkhttpClient$Builder;->build()Lokhttp3/OkhttpClient;

move-result-object v0 return-object v0
.end method
```

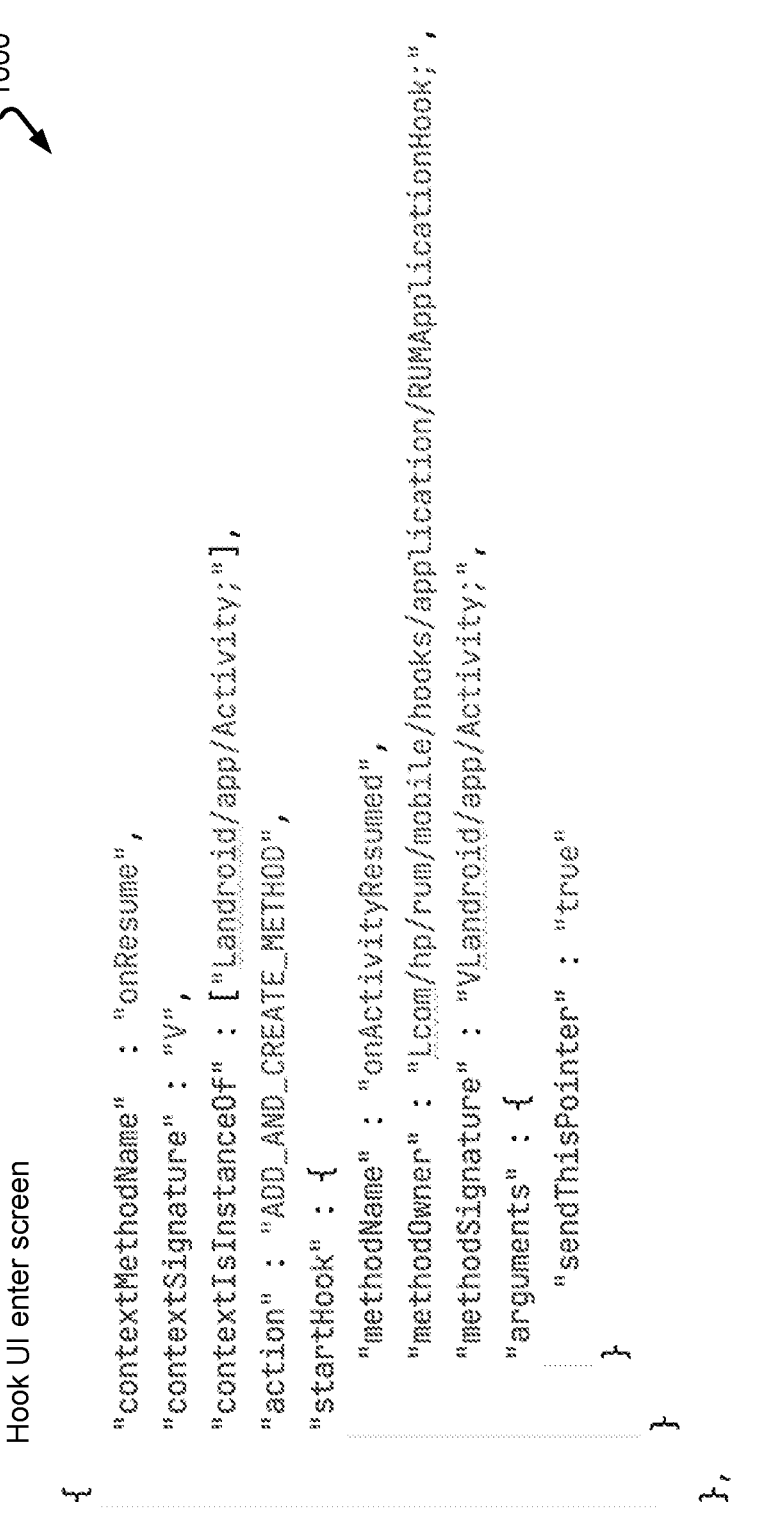

```
Hook UI enter screen

"contextMethodName"    :  "onResume",
"contextSignature"  :  "V",
"contextIsInstanceOf"  :  ["Landroid/app/Activity;"],
"action"  :  "ADD_AND_CREATE_METHOD",
"startHook"  :  {
    "methodName"  :  "onActivityResumed",
    "methodOwner"  :  "Lcom/hp/rum/mobile/hooks/application/RUMApplicationHook;",
    "methodSignature"  :  "VLandroid/app/Activity;",
    "arguments"  :  {
        "sendThisPointer"  :  "true"
    }
}
```

*Fig. 10*

Before infusion:

```
.method protected onResume()V
    .registers 12

.line 354
    invoke-super {v11}, Lcom/microfocus/sma/mobile/app/common/baseActivities/BaseActivity;->onResume()V .line 355
    invoke-virtual {v11}, Lcom/microfocus/sma/mobile/app/features/portal/home/MainActivity;->getCommonSetti
```

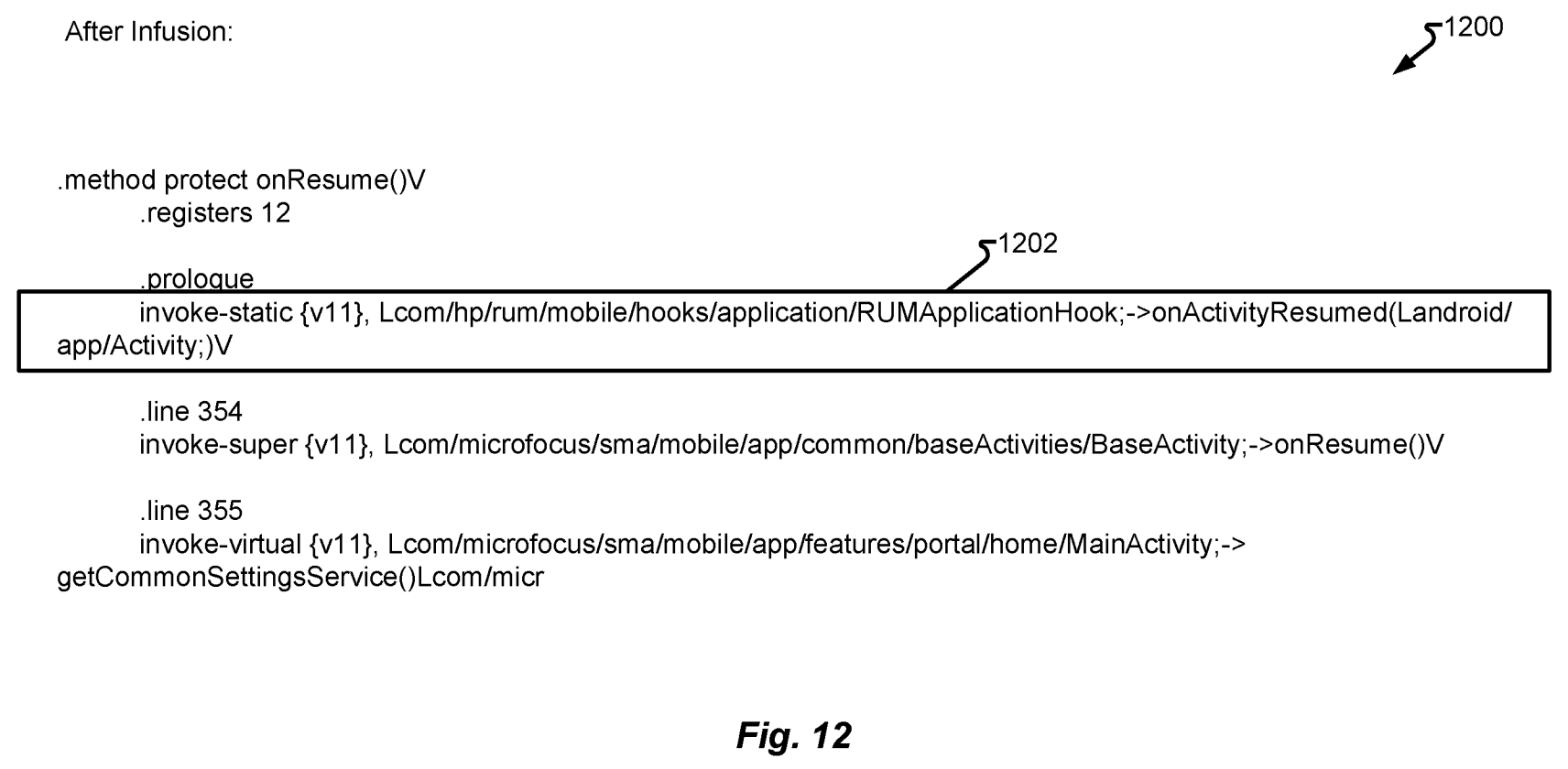

1200

After Infusion:

.method protect onResume()V
   .registers 12

.prologue
      invoke-static {v11}, Lcom/hp/rum/mobile/hooks/application/RUMApplicationHook;->onActivityResumed(Landroid/app/Activity;)V    1202

.line 354
   invoke-super {v11}, Lcom/microfocus/sma/mobile/app/common/baseActivities/BaseActivity;->onResume()V .line 355
   invoke-virtual {v11}, Lcom/microfocus/sma/mobile/app/features/portal/home/MainActivity;->getCommonSettingsService()Lcom/micr

*Fig. 12*

Hook crash reporter:

```
                                                                 1300
{
    "calledMethodName": "setDefaultUncaughtExceptionHandler",
    "calledSignature": "V(java/lang/Thread$UncaughtExceptionHandler;",
    "calledIsInstanceOf": ["Ljava/lang/Thread;"],
    "action": "WRAP",
    "endHook": {
        "methodName": "onSetDefaultUncaughtExceptionHandler",
        "methodOwner": "Lcom/hp/rum/mobile/hooks/application/RUMApplicationHook;",
        "methodSignature": "V"
    }
}, {
    "contextMethodName": "uncaughtException",
    "contextSignature": "V(java/lang/Thread;Ljava/lang/Throwable;",
    "contextIsInstanceOf": ["Ljava/lang/Thread$UncaughtExceptionHandler;"],
    "action": "ADD",
    "startHook": {
        "methodName": "onThreadUnhandledException",
        "methodOwner": "Lcom/hp/rum/mobile/hooks/application/RUMApplicationHook;",
        "methodSignature": "V(java/lang/Thread;Ljava/lang/Throwable;",
        "arguments" : {
            "sendThisPointer" : "false",
            "contextArgArray": [0, 1]
        }
    }
},
```

Fig. 13

After Infusion:

.line 170
.local v0, "defHandler":Ljava/lang/Thread$UncaughtExceptionHandler;
new-instance v1, Landroidx/appcompat/app/AppCompatDelegateImpl$1;

invoke-direct {v1, v0}, Landroidx/appcompat/app/AppCompatDelegateImpl$1;-><init>(Ljava/lang/
Thread$UncaughtExceptionHandler;)V

⌐1402 invoke-static {v1}, Ljava/lang/Thread;->setDefaultUncaughtExceptionHandler(Ljava/lang/Thread$UncaughtExceptionHandler;)V invoke-static {}, Lcom/hp/rum/mobile/hooks/application/RUMApplicationHook;->onSetDefaultUncaughtExceptionHandler()V .line 196
sput-boolean v2, Landroidx/appcompat/app/AppCompatDelegateImpl;->sInstalledExceptionHandler:Z .line198
.end local v0          #"defHandler":Ljava/lang/Thread$UncaughtExceptionHandler;
:cond_49
return-void .registers 6
.param p1, "thread"          # Ljava/Lang/Thread;
.param p2, "throwable"          # Ljava/lang/Throwable;

.prologue

⌐1404 invoke-static {v4, v5}, Lcom/hp/rum/mobile/hooks/application/RUMApplicationHook;->onThreadUnlandledException(Ljava/Lang/
Thread;Ljava/Lang/Throwable;)V .line 174
invoke-direct {v3, v5}, Landroidx/appcompat/app/AppCompatDelegateImpl$1;->shouldWrapException(Ljava/Lang/Throwable;)Z move-result v0

AUTOMATIC REAL USER MONITORING (RUM) INSTRUMENTATION

FIELD OF THE DISCLOSURE

The invention relates generally to systems and methods for instrumenting an application and particularly to automatic application of instrumentation to an application packaged in an application package.

BACKGROUND

Automatic Real User Monitoring (RUM) is a monitoring tool for Android-based applications that tracks user interactions, identifies performance issues, detects errors, and improves user experience. To make the Android application observable, it must be instrumented: That is, the source code of mobile application emits traces, metrics, and/or logs. A RUM instrument has the ability to track and report on how users interact with the application to provide insight into how the application is performing in real-world scenarios.

Despite the advantages, prior art RUM instrument solutions require modifications to the source code and corresponding additional skills, like how to use a third-party RUM software development kit (SDK) and how to use the imported libraries. In addition, application providers (instead of developers) may want to add instrumentation after the Android application is packaged.

Prior art RUM instrument solutions for Android apps require modification of the source code to implement instrumentation. These solutions can be complex, skill-intensive, and time-consuming to implement and may introduce errors or bugs into the codebase. There are several tools to implement RUM, in particular, "OpenTelemetry" (or "OTEL"). For example, OTEL libraries provide APIs for creating spans, which are units of work in an application that are timed and traced. This typically involves adding a few lines of code to the application and configuring an agent with the appropriate settings. After these code changes are made, the code is then packaged using the Android Package Kit (APK) file format with an OpenTelemetry SDK and/or Android Package Kit (APK) file and then published to be available for download, such as via Google Play, and installed on users' Android devices.

SUMMARY

Prior art instrumentation tools require implementation by highly skilled developers. While prior art solutions may have a limited ability to insert RUM code into a source code file, the prior art solutions cannot be added after packaging, such as to an Android application bundle (AAB) or Android package kit (APK) file. As a result, application owners cannot implement the RUM instrument except by asking help from application developers.

These and other needs are addressed by the various embodiments and configurations of the present invention. The present invention can provide a number of advantages depending on the particular configuration. These and other advantages will be apparent from the disclosure of the invention(s) contained herein.

In one embodiment, systems and methods are disclosed to develop and use a tool to enable a user (who may have, but is not required to utilize, application development abilities) to import an Android AAB or APK file and run the tool to inject the instrument into the file. The instrumentation injection process may be customized, such as to include or exclude particular instrumentation and enable the receipt of the corresponding information necessary for a particular application. This approach differs from traditional RUM instruments in that it provides a more cost-saving, user-friendly, skill-reduced approach to implement RUM monitoring.

The systems and methods disclosed herein provide various advantages including, but not limited to:

No source code modification needed: Unlike prior art solutions that require application developers to modify their code, the solution herein automatically injects the RUM instrumentation without changing the original source code, as such modifications are performed on post-build files. As a benefit, application owners or other non-developers may implement instrumentation into the Android application after coding is complete. It should be appreciated that an "application owner," for purposes herein, refers to one or more individuals or a business having access to an application package for which instrumentation is to be provided-actual ownership of the application may be present but is not required.

Supports Android AAB and APK files: Solutions herein can utilize Android AAB or APK files as the application input, in order to insert instrumentation, and output either (or both) an Android AAB or APK file therefrom. As a result, integration of RUM instrumentation into existing package workflows is provided regardless of the packaging format.

Customizable instrumentation: Solutions herein allow the instrumentation to be customized in order to collect all necessary information without wasting resources collecting unnecessary information.

Reduces effort: The solutions provided herein automate the instrumentation process and, as a result, save application developer time and effort, allowing them to focus on other aspects of their application.

User-friendly Graphical User Interface (GUI): Solutions provided herein enable a user-friendly GUI for application owners or application developers to infuse the instruments based on the application logics, making the process more intuitive and accessible.

Embodiments here automate the process of injecting RUM (Real User Monitoring) instrumentation into Android AAB and APK files without modifying the source code. This addresses the issue of prior solutions requiring manual code modification in the source code developing stage, which cannot deal with the packaged Android application and is time consuming. Additionally, certain embodiments customize the instrumentation and include a user-friendly GUI, providing a streamlined and efficient way for application owners or application developers to integrate RUM monitoring into their apps. Embodiments are generally applicable to the post-build stage, reducing the time and effort required and eliminating the need for source code modifications, making the process quicker and easier for application owners or application developers. Prior art solutions are only for those application developers who have skill to change the source code by adding instruments manually, while the solution provided herein is suitable for both application owners and developers. This is a comprehensive solution for Android application RUM instrumentation.

In one embodiment, an integrated development environment (IDE) is provided to automatically insert RUM instrumentation into an application that has been packaged as AAB or APK files in four steps: (1) extracting the application from the AAB/APK file; (2) providing the GUI presenting specific instrumentation methods and classes instrumentation and receiving a selection thereof; (3) infusing the application files with the selected instrumentation; and (4) bundling the infused files to a new AAB/APK. It should be appreciated that additional steps may be added, without departing from the scope of the embodiments herein, as a matter of design or implementation choice. More specifically:

1. Extract the Original ABB or APK:

First, unpacking the imported AAB or APK file to extract the Dalvik Executable (Dex) files (compiled Java code), Android manifest, resource files, and assets for the application. The resources and assets do not require modification. The original Android manifest file in an Android layout view (AXML) format are decoded to a source manifest file in an extensible markup language (XML) format. The Dex files will be disassembled to generate source code file of the Dex files, namely, Smali by a Smali tool (e.g., Baksmali). The Smali tool is an existing Dex analysis tool that can decompile the compiled Java bytecode of Dex files.

2. Conduct Instrumentation within an Instrument IDE with GUI:

The Smali files provide the logic of the Dex files in human-readable form. The Smali tool recognizes the logic therein and provides the ability to hook or inject a portion of the instrumentation logic. To make it easier for application owners or developers to instrument the application, an IDE with GUI is provided to present the content of Smali files. The instrument IDE enables a review of the classes and methods of the application. A user can then choose the necessary classes and methods that need to be monitored and add the correct hooks or injections, such as via clicking a corresponding checkbox. After any customizations are selected, the instrumentation in the IDE generates a configuration file that stores the RUM instrument settings. The configuration file is then available for use by the Smali tool. A GUI-based interface provides a more efficient and convenient means for application owners or application developers to inject the instrumentation than the classic approach by making the source code changes.

3. Infuse the Smali Files and Android Manifest with RUM Instrumentation:

The Smali tool recognizes the instrumentation configurations which are generated by the previous step and performs instrumentation injection for the Smali source files and Android Manifest XML. The Smali files and Android Manifest file are then infused with customized instrumentation by an infusion engine. For the infused Smali files "bakSmali" is used to disassemble the Smali files back to Dex files—now infused with instrumentation. The infused Android Manifest is linked with the resource paths which are from extracted resources files (e.g., xml files, images, etc.). After completion of step 3, the infused Dex files, infused manifest, resources, and assets are generated and are ready for bundling the package format.

4. Bundle the Infused Files to a New Android AAB or APK:

A bundling tool is provided, such as the Android Bundle tool by Google, to generate the AAB or APK from the four outputs (e.g., Dex files, infused manifest, resources, and assets) from the last step. The bundling tool provides selectable option for the format they want (e.g., AAB and/or APK).

Application owners need only upload the Android AAB or APK which need to be instrumented to the instrument IDE and choose which classes or methods to be hooked in GUI. The AAB and/or APK, now with instrumentation, is available for uploading to a repository (e.g., Google Play) and then for subsequent user download, installation, and use of the instrumented application. The instrumentation will then report events chosen when they occur.

In some aspects, the techniques described herein relate to a method, including: accessing an application package including executable application code; extracting the executable application code from the application package; decompiling the executable application code into a generated source code file; matching a portion on the generated source code file to an instrumentation signature; inserting, in the generated source code file, in at least one of before the instrumentation signature and after the instrumentation signature, an instrumentation code to produce an instrumented source code; compiling the instrumented source code into an instrumented executable application code; and packaging the instrumented executable application code into an instrumented application package.

In some aspects, the techniques described herein relate to a method, wherein the executable application code includes binary Dalvik bytecode (DEX).

In some aspects, the techniques described herein relate to a method, wherein the generated source code file includes Smali text.

In some aspects, the techniques described herein relate to a method, further including inserting the instrumentation code in at least one of directly before or directly after the instrumentation signature, respectively.

In some aspects, the techniques described herein relate to a method, further including: extracting a machine-readable manifest from the application package; decompiling the machine-readable manifest into an intermediate manifest; matching a portion of the intermediate manifest to an object signature; inserting, in the intermediate manifest, in at least one of before the instrumentation signature and after the instrumentation signature, an instrumentation object to produce an instrumented manifest; compiling the instrumented manifest into an instrumented machine-readable manifest; and packaging the instrumented machine-readable manifest into the instrumented application package.

In some aspects, the techniques described herein relate to a method, wherein the machine-readable manifest includes Android layout view (AXML) content.

In some aspects, the techniques described herein relate to a method, wherein at least one of the intermediate manifest and the instrumented manifest include extensible markup language (XML) instructions.

In some aspects, the techniques described herein relate to a method, wherein packaging the instrumented executable application code into the instrumented application package further includes: receiving a package type; and in response to the package type, packaging the instrumented executable application code into the instrumented application package having the package type.

In some aspects, the techniques described herein relate to a method, wherein the package type is selected from a group including Android application bundle (AAB) or Android package kit (APK).

In some aspects, the techniques described herein relate to a method, wherein extracting the executable application code from the application package further includes extracting at least one of a resource or an asset from the application package.

In some aspects, the techniques described herein relate to a method, wherein packaging the instrumented executable application code into the instrumented application package further includes packaging the at least one of the resource or the asset in the instrumented application package.

In some aspects, the techniques described herein relate to a method, including: accessing an application package including executable manifest; extracting the executable manifest from the application package; decoding the executable manifest into an intermediate manifest; matching a portion on the intermediate manifest to an object signature; inserting, in the intermediate manifest, in at least one of before the object signature and after the object signature an instrumentation code to produce an instrumented manifest; encoding the instrumented manifest into an instrumented machine-readable manifest; and packaging the instrumented machine-readable manifest into an instrumented application package.

In some aspects, the techniques described herein relate to a method, wherein the intermediate manifest includes an Android manifest (AXML).

In some aspects, the techniques described herein relate to a method, wherein the instrumented manifest includes an extensible markup language (XML).

In some aspects, the techniques described herein relate to a method, further including: extracting an executable application code from the application package; decompiling the executable application code into a generated source code file; matching a portion on the generated source code file to an instrumentation signature; inserting, in the generated source code file, in at least one of before the instrumentation signature and after the instrumentation signature, an instrumentation code to produce an instrumented source code; compiling the instrumented source code into an instrumented executable application code; and packaging the instrumented executable application code into the instrumented application package.

In some aspects, the techniques described herein relate to a method, wherein the executable application code includes binary Dalvik bytecode (DEX).

In some aspects, the techniques described herein relate to a method, wherein the generated source code file includes Smali text.

In some aspects, the techniques described herein relate to a method, wherein packaging the instrumented executable application code into the instrumented application package further includes: receiving a package type; and in response to the package type, packaging the instrumented executable application code into the instrumented application package having the package type.

In some aspects, the techniques described herein relate to a method, wherein the package type is selected from a group including Android application bundle (AAB) or Android package kit (APK).

In some aspects, the techniques described herein relate to a system, including: a data storage maintaining an application package including executable application code; a processor coupled to a computer memory and having stored thereon instructions to cause the processor to: access the application package from the data storage; extract the executable application code from the application package; decompiling the executable application code into a generated source code file; matching a portion on the generated source code file to an instrumentation signature; inserting, in the generated source code file, in at least one of before the instrumentation signature and after the instrumentation signature, an instrumentation code to produce an instrumented source code; compiling the instrumented source code into an instrumented executable application code; packaging the instrumented executable application code into an instrumented application package; and store the instrumented application package in the data storage.

A system on a chip (SoC) including any one or more of the above aspects or aspects of the embodiments described herein.

One or more means for performing any one or more of the above aspects or aspects of the embodiments described herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above aspects, wherein the data storage comprises a non-transitory storage device, which may further comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized.

The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures:

FIG. 4 depicts code in accordance with embodiments of the present disclosure;

FIG. 5 depicts code in accordance with embodiments of the present disclosure;

FIG. 6 depicts code in accordance with embodiments of the present disclosure;

FIG. 7 depicts code in accordance with embodiments of the present disclosure;

FIG. 8 depicts code in accordance with embodiments of the present disclosure;

FIG. 9 depicts code in accordance with embodiments of the present disclosure;

FIG. 10 depicts code in accordance with embodiments of the present disclosure;

FIG. 12 depicts code in accordance with embodiments of the present disclosure;

FIG. 13 depicts code in accordance with embodiments of the present disclosure;

FIG. 14 depicts code in accordance with embodiments of the present disclosure;

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with the like reference number. When such a reference is made in the singular form, but without identification of the sub-reference identifier, it is a reference to one of the like numbered elements, but without limitation as to the particular one of the elements being referenced. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
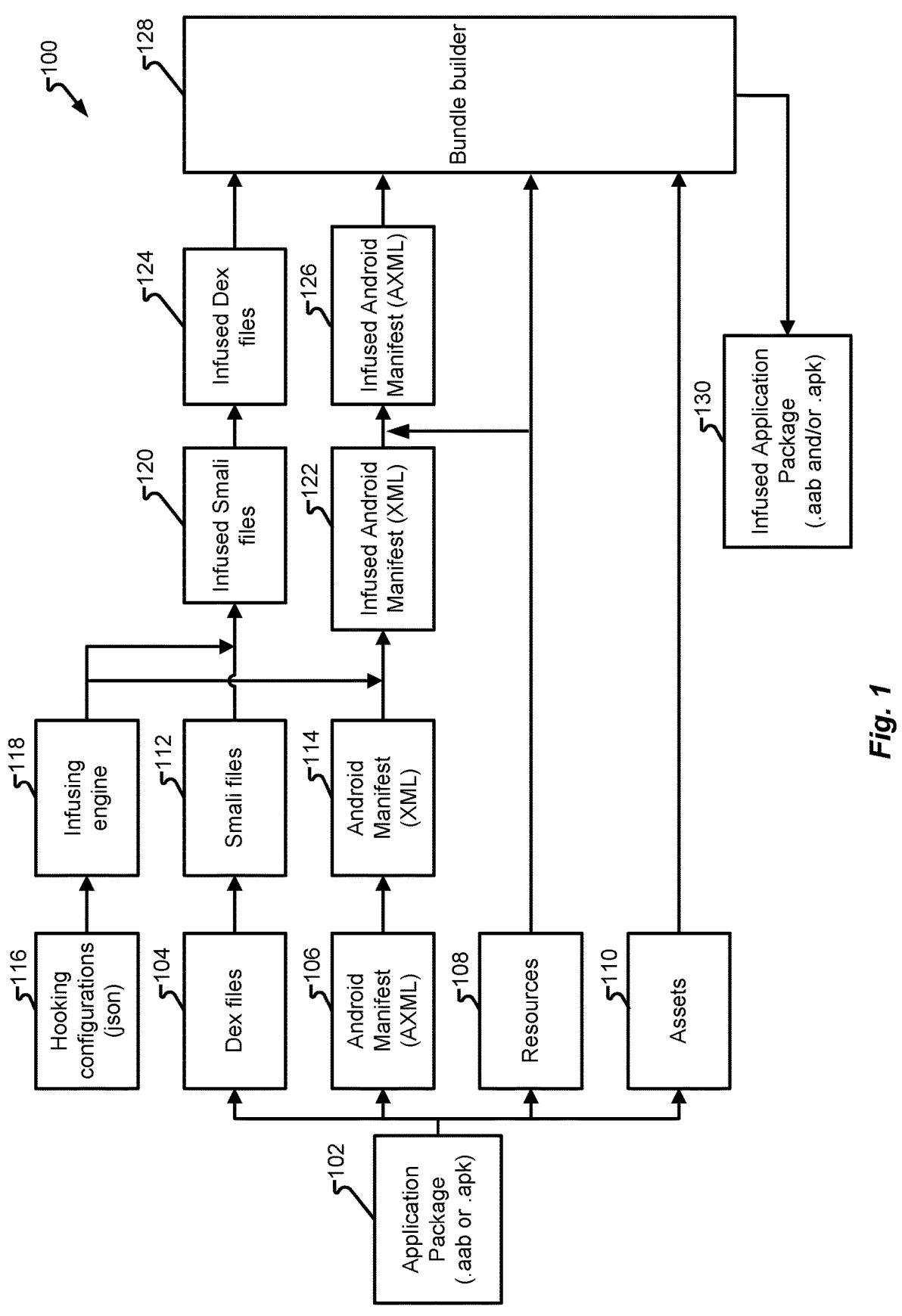
FIG. 1 depicts a data flow in accordance with embodiments of the present disclosure.

FIG. 1 depicts data flow 100 in accordance with embodiments of the present disclosure. In one embodiment, process 100 is embodied as machine-readable instructions maintained in a non-transitory memory that when read by a machine, such as processor(s) of a server(s) or other computing device(s), cause the machine(s) to execute the instructions and thereby execute process 100.

Application package 102 is accessed. Application package 102 may be either an Android package kit file format (APK) or Android package kit (APK) file. Dex files 104, Android manifest 106, resources 108, and assets 110 are extracted from application package 102. Resources 108 and assets 110 do not require modification and may be re-packaged without modification. Dex files 104 are Dalvik executables comprising complied Java code. Dex files 104 are disassembled by a disassembler (e.g., baksmali) into Smali files 112. Smali files 112 are not the original source code but comprise textual representation of the instructions that are human readable.

Android manifest 106 comprises Android layout view (AXML) file format, which is decoded into Android manifest 114, an extensible markup language (XML) file format.

Once Smali files 112 and/or the Android manifest 114 files are available, instrumentation may be automatically applied thereto. Hooking configurations 116 may comprise human-readable instructions (e.g., JSON) for the selection of the particular instrumentation to apply. Infusion engine 118 utilizes hooking configurations 116 to look for particular instructions to types of instructions in Smali files 112 and/or objects in Android manifest 114. For example, if HTTP requests are to be instrumented, then infusing engine 118 will identify such requests and insert the proper instrumentation, such as the particular URL called and aspects (e.g., error codes, response times, etc.). Other instrumentation may be applied to report crashes or other errors of the application as well as pages of the application and, option-ally, a summary of the parameters used to call the page. As a result, the application owners may know what users are actually experiencing when utilizing the application and any usability issues or other defects that may occur in the application or in the application's interaction with other services (e.g., web pages, servers, etc.). The resulting infused Smali files 120 may then be assembled into infused Dex files 124.

Instrumentation may be added to Android manifest 114, such as to add additional objects to the manifest. Similarly to how infusing engine 118 adds instrumentation code to Smali files 112, infusing engine 118 looks for an object (exact or pattern-matching) and adds instrumentation objects to the manifest to create infused android manifest 122, such as in XML format. Infused android manifest 122, in XML format, may then be converted to infused Android manifest 126 in AXML format, which may include resources 108.

Bundle builder 128 packages infused Dex files 124, infused Android manifest 126, resources 108, and assets 110 into infused application package 130, which may be selected to be one or both of .aab or .apk packages. The resulting infused application package 130 may then be uploaded to a data repository (e.g., Google Play) for download, installed, and used by end user devices and reporting events in accordance with the instrumentation inserted.

As a benefit of data flow 100, instrumentation is provided without human intervention and without access to the original source code.

Figure 2:
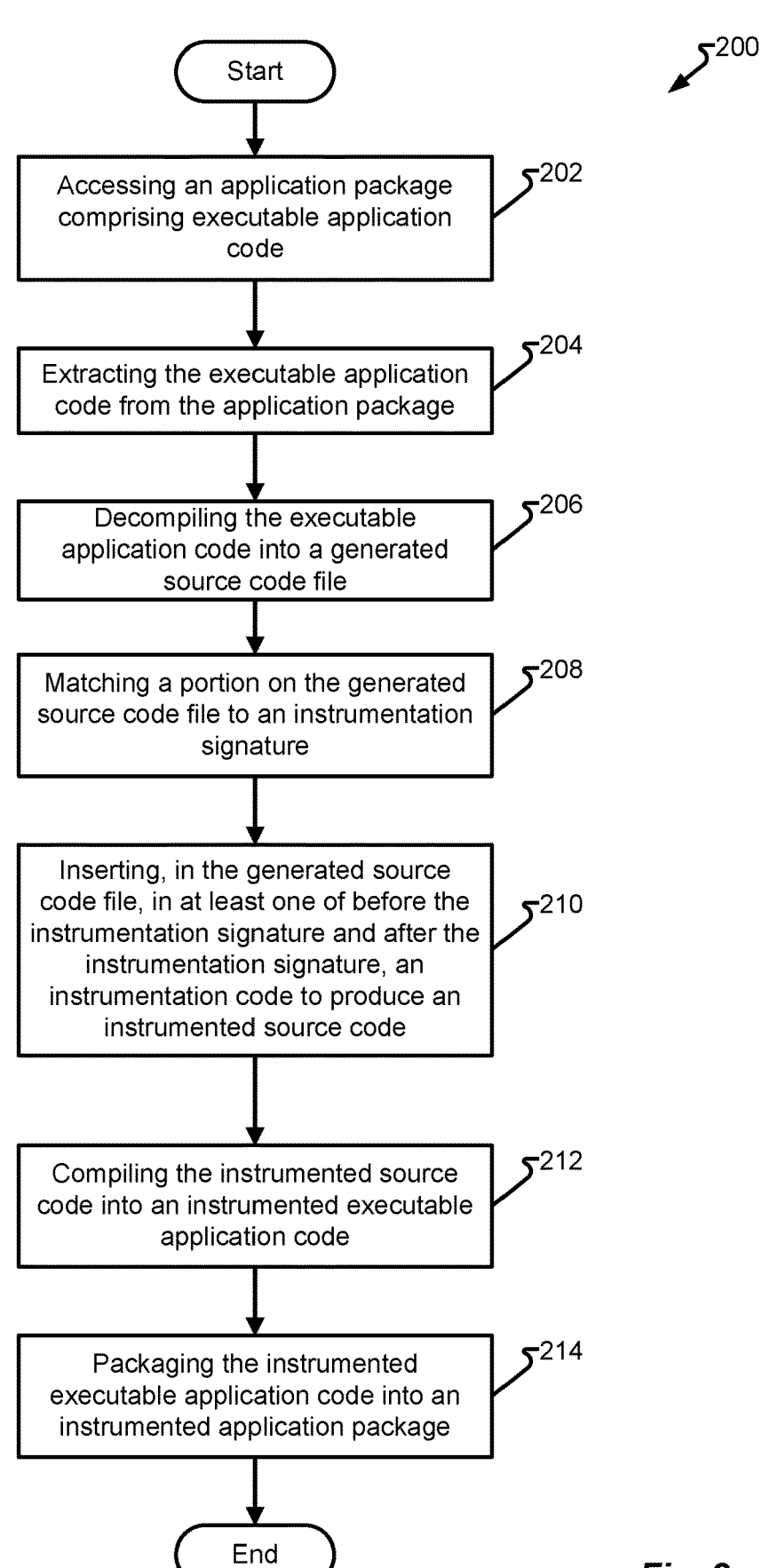
FIG. 2 depicts a process in accordance with embodiments of the present disclosure.

FIG. 2 depicts process 200 in accordance with embodiments of the present disclosure. In one embodiment, process 200 is embodied as machine-readable instructions maintained in a non-transitory memory that when read by a machine, such as processor(s) of a server(s) or other computing device(s), cause the machine(s) to execute the instructions and thereby execute process 200.

Process 200 begins and, in step 202, an application package comprising executable application code is accessed. Step 202 may access the application package, such as application package 102, from a local or remote repository, including, but not limited to, an application store (e.g., Google Play). Step 204 extracts the executable application code, such as dex files 104, from the application package. Step 206 decompiles the executable application code into a generated source code file, such as Smali files 112.

Step 208 matches a portion of the generated source code file, such as a portion performing an instruction to be instrumented. Step 210 then inserts instrumentation into the generated source code file to produce an instrumented source code file, such as application package 102. The instrumentation may be performed by an automated process, such as infusing engine 118 configured with instructions, such as from hooking configurations 116. Inserting the instrumentation may be the addition of instrumentation code before, directly before, after, and/or directly after code matching a signature. For example, if web page accesses are to be instrumented, then code signatures with HTTP or HTTPS are matched and instrumentation code added. Instrumentation may be proximate to the code that matches the signature or the code that directly precedes and/or directly follows the code to be instrumented. As a further option, the code matching the code signature may be altered to include the instrumentation therein.

Step 212 compiles the instrumented source code into an instrumented executable application code, such as infused Dex files 124. Step 214 then packages the instrumented executable application code into an instrumented application package, such as infused application package 130, along with any other files necessary for the application or application package.

Figure 3:
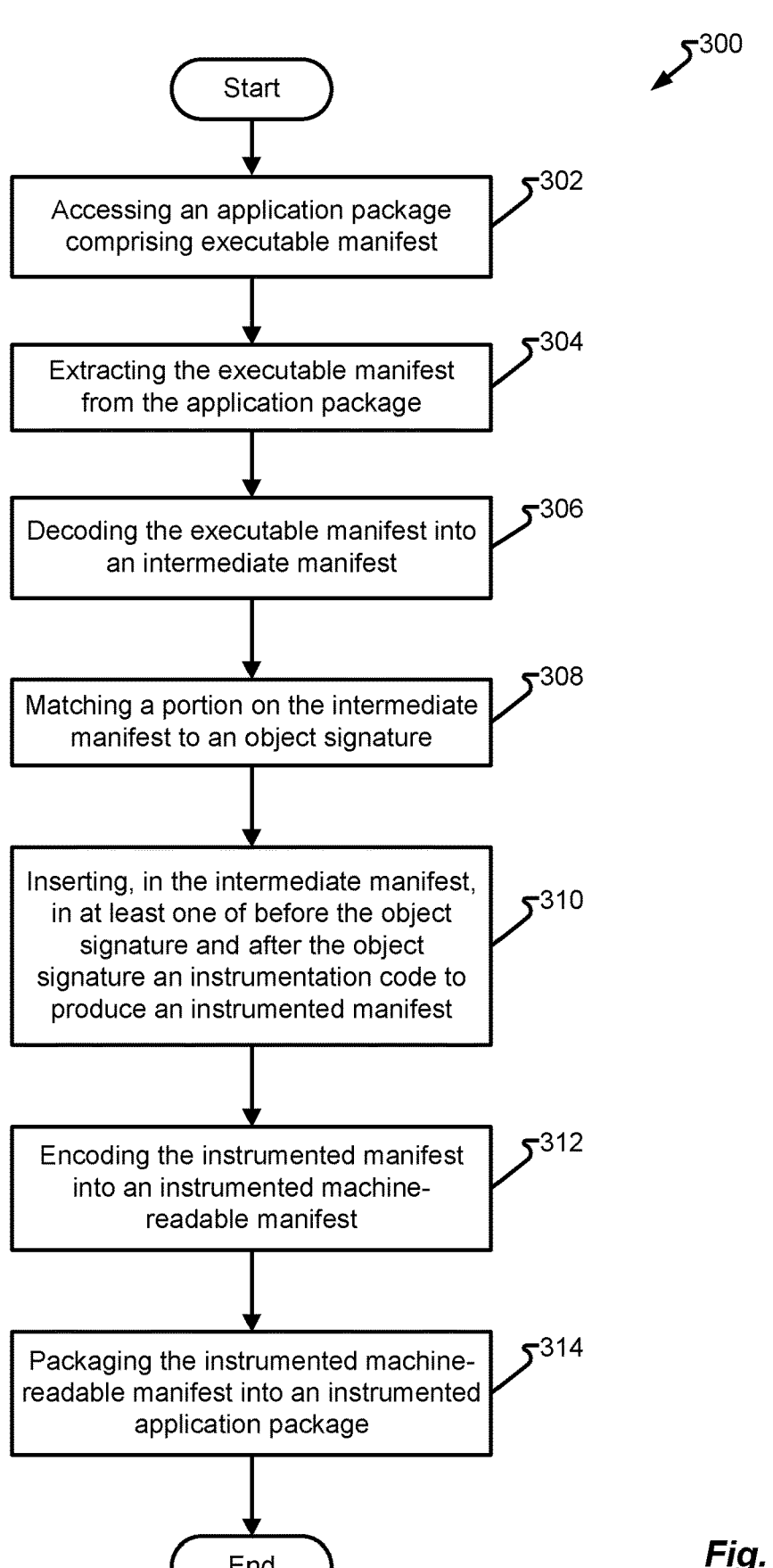
FIG. 3 depicts a process in accordance with embodiments of the present disclosure.

FIG. 3 depicts process 300 in accordance with embodiments of the present disclosure. In one embodiment, process 300 is embodied as machine-readable instructions maintained in a non-transitory memory that when read by a machine, such as processor(s) of a server(s) or other computing device(s), cause the machine(s) to execute the instructions and thereby execute process 300.

Process 300 begins and, in step 302, an application package comprising an executable manifest is accessed. Step 302 may access the application package, such as application package 102, from a local or remote repository, including, but not limited to, an application store (e.g., Google Play). Step 304 extracts the executable manifest, such as Android manifest 106, from the application package. Step 306 decoding the executable manifest into an intermediate manifest, such as android manifest 114.

Step 308 matches a portion of the intermediate manifest, such as a portion of android manifest 114, comprising an object to be instrumented. Step 310 then inserts instrumentation into the intermediate manifest to produce an instrumented manifest, such as infused Android manifest 122. The instrumentation may be performed by an automated process, such as infusing engine 118 configured with instructions, such as from hooking configurations 116. Inserting the instrumentation may be the addition of instrumentation code before, directly before, after, and/or directly after an object matching a signature. Instrumentation may be proximate to the object that matches the signature or the object that directly precedes and/or directly follows the object to be instrumented. As a further option, the object matching the object signature may be altered to include the instrumentation therein.

Step 312 encodes the instrumented manifest into an instrumented machine-readable manifest, such as executable application code, such as infused Android manifest 126. Step 314 then packages the instrumented machine-readable manifest into an instrumented application package, such as infused application package 130, along with any other files necessary for the application or application package.

FIG. 4 depicts code 400 in accordance with embodiments of the present disclosure. Code 400 illustrates an instruction (e.g., hooks) defining a code signature for instruction code to be instrumented (e.g., "Web ViewClient"). In one embodiment, code 400 illustrates hooks as an example of hooking configurations 116.

FIG. 5 depicts code 500 in accordance with embodiments of the present disclosure. Code 500 illustrates code to be instrumented from hooks in code 400. Code 500 illustrates an example of Smali files 112.

FIG. 6 depicts code 600 in accordance with embodiments of the present disclosure. Code 600 illustrates the insertion of code 602, in accordance with hooks in code 400, which, in one embodiment, directly precedes the code to be instrumented (e.g., "Web ViewClient"). Code 600 illustrates an example of resulting infused Smali files 120.

FIG. 7 depicts code 700 in accordance with embodiments of the present disclosure. Code 700 illustrates an instruction (e.g., hooks) defining a code signature for instruction code to be instrumented (e.g., "ClientBuilderBuild"). In one embodiment, code 700 illustrates hooks as an example of hooking configurations 116.

FIG. 8 depicts code 800 in accordance with embodiments of the present disclosure. Code 800 illustrates code to be instrumented from hooks from code 700. Code 800 illustrates an example of Smali files 112.

FIG. 9 depicts code 900 in accordance with embodiments of the present disclosure. Code 900 illustrates the insertion of code 902 in accordance with hooks in code 700, which, in one embodiment, directly precedes the code to be instrumented (e.g., "ClientBuilderBuild"). Code 900 illustrates an example of resulting infused Smali files 120.

FIG. 10 depicts code 1000 in accordance with embodiments of the present disclosure. Code 1000 illustrates an instruction (e.g., hooks) defining a code signature for instruction code to be instrumented (e.g., "onResume"). In one embodiment, code 1000 illustrates hooks as an example of hooking configurations 116.

Figure 11:
FIG. 11 depicts code in accordance with embodiments of the present disclosure.

FIG. 11 depicts code 1100 in accordance with embodiments of the present disclosure. Code 1100 illustrates code to be instrumented with hooks from code 1000. Code 1100 illustrates an example of Smali files 112.

FIG. 12 depicts code 1200 in accordance with embodiments of the present disclosure. Code 1200 illustrates the insertion of code 1202 in accordance with hooks in code 1000, which, in one embodiment, directly precedes the code to be instrumented (e.g., "onResume"). Code 1200 illustrates an example of resulting infused Smali files 120.

FIG. 13 depicts code 1300 in accordance with embodiments of the present disclosure. Code 400 illustrates an instruction (e.g., hooks) defining a code signature for instruction code to be instrumented (e.g., "ExceptionHandler" and "Throwable"). In one embodiment, code 1300 illustrates hooks as an example of hooking configurations 116.

FIG. 14 depicts code 1400 in accordance with embodiments of the present disclosure. Code 1400 illustrates the insertion of code 1402 and 1404 in accordance with hooks from code 1200, which, in one embodiment, directly precedes the code to be instrumented (e.g., "ExceptionHandler" and "Throwable"). Code 1400 illustrates an example of resulting infused Smali files 120.

Figure 15:
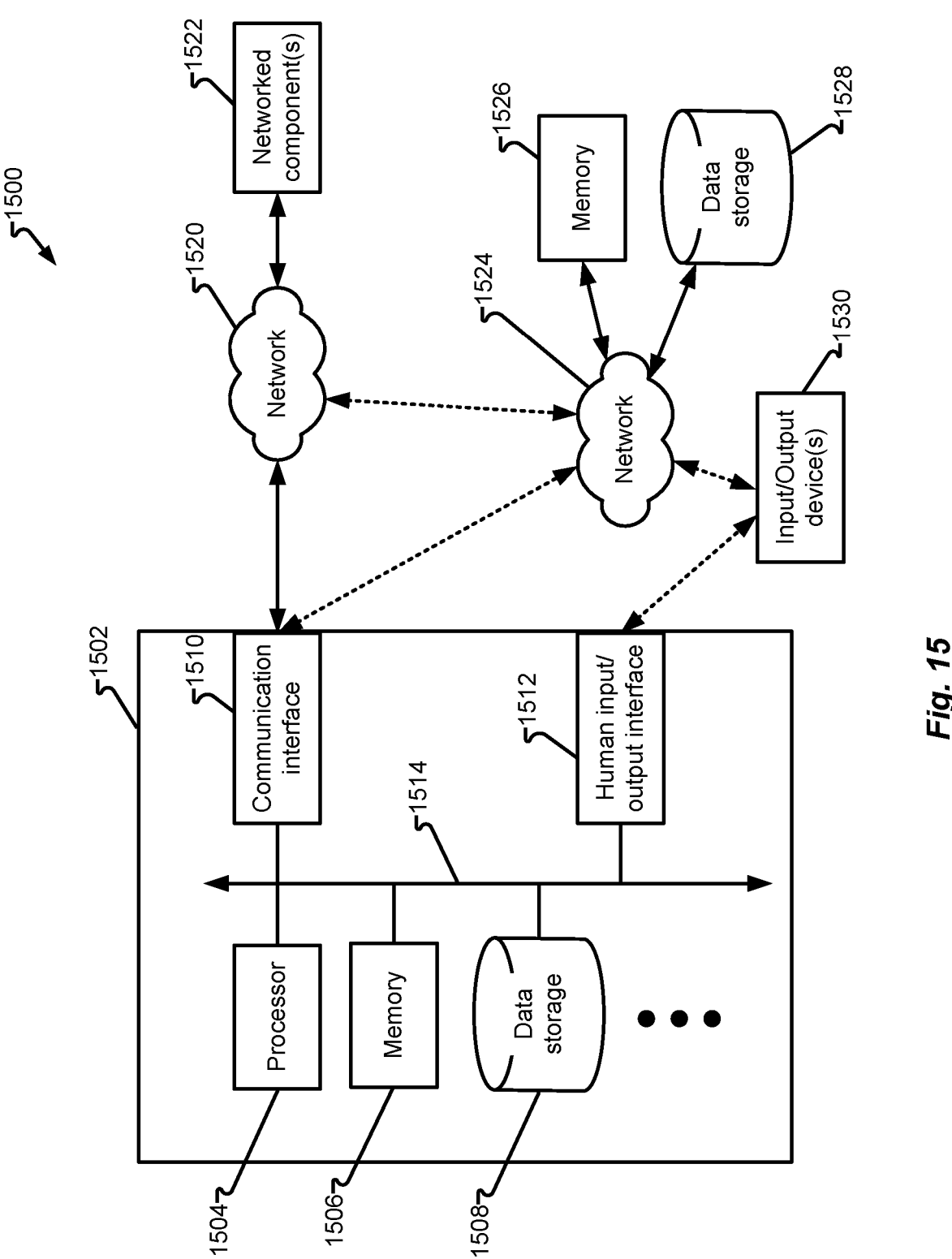
FIG. 15 depicts a process in accordance with embodiments of the present disclosure.

FIG. 15 depicts device 1502 in system 1500 in accordance with embodiments of the present disclosure. Device 1502 comprises various components and connections to other components and/or systems and may execute methods, or portion thereof, described herein. The components are variously embodied and may comprise processor 1504. The term "processor," as used herein, refers exclusively to electronic hardware components comprising electrical circuitry with connections (e.g., pin-outs) to convey encoded electrical signals to and from the electrical circuitry. Processor 1504 may comprise programmable logic functionality, such as determined, at least in part, from accessing machine-readable instructions maintained in a non-transitory data storage, which may be embodied as circuitry, on-chip read-only memory, computer memory 1506, data storage 1508, etc., that cause the processor 1504 to perform the steps of the instructions. Processor 1504 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 1514, executes instructions, and outputs data, again such as via bus 1514. In other embodiments, processor 1504 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 1504 is a non-transitory computing device (e.g., electronic machine comprising circuitry and connections to communicate with other components and devices). Processor 1504 may operate a virtual processor, such as to process machine instructions not native to the processor (e.g., translate the VAX operating system and VAX machine instruction code set into Intel® 9xx chipset code to enable VAX-specific applications to execute on a virtual VAX processor). However, as those of ordinary skill understand, such virtual processors are applications executed by hardware, more specifically, the underlying electrical circuitry and other hardware of the processor (e.g., processor 1504). Processor 1504 may be executed by virtual processors, such as when applications (i.e., Pod) are orchestrated by Kubernetes. Virtual processors enable an application to be presented with what appears to be a static and/or dedicated processor executing the instructions of the application, while underlying non-virtual processor(s) are executing the instructions and may be dynamic and/or split among a number of processors.

In addition to the components of processor 1504, device 1502 may utilize computer memory 1506 and/or data storage 1508 for the storage of accessible data, such as instructions, values, etc. Communication interface 1510 (also known as a network interface) facilitates communication with components, such as processor 1504 via bus 1514 with components not accessible via bus 1514. Network interface 1510 may be embodied as a network port, card, cable, or other configured hardware device. Additionally or alternatively, human input/output interface 1512 connects to one or more interface components to receive and/or present information (e.g., instructions, data, values, etc.) to and/or from a human and/or electronic device. Examples of input/output devices 1530 that may be connected to input/output interface include, but are not limited to, keyboard, mouse, trackball, printers, displays, sensor, switch, relay, speaker, microphone, still and/or video camera, etc. In another embodiment, communication interface 1510 may comprise, or be comprised by, human input/output interface 1512. Communication interface 1510 may be configured to communicate directly with a networked component or configured to utilize one or more networks, such as network 1520 and/or network 1524.

Network 1520 may be a wired network (e.g., Ethernet), wireless (e.g., WiFi, Bluetooth, cellular, etc.) network, or combination thereof and enable device 1502 to communicate with networked component(s) 1522. In other embodiments, network 1520 may be embodied, in whole or in part, as a telephony network (e.g., public switched telephone network (PSTN), private branch exchange (PBX), cellular telephony network, etc.).

Additionally or alternatively, one or more other networks may be utilized. For example, network 1524 may represent a second network, which may facilitate communication with components utilized by device 1502. For example, network 1524 may be an internal network to a business entity or other organization, whereby components are trusted (or at least more so) than networked components 1522, which may be connected to network 1520 comprising a public network (e.g., Internet) that may not be as trusted.

Components attached to network 1524 may include computer memory 1526, data storage 1528, input/output device(s) 1530, and/or other components that may be accessible to processor 1504. For example, computer memory 1526 and/or data storage 1528 may supplement or supplant computer memory 1506 and/or data storage 1508 entirely or for a particular task or purpose. As another example, computer memory 1526 and/or data storage 1528 may be an external data repository (e.g., server farm, array, "cloud," etc.) and enable device 1502, and/or other devices, to access data thereon. Similarly, input/output device(s) 1530 may be accessed by processor 1504 via human input/output interface 1512 and/or via network interface 1510 either directly, via network 1524, via network 1520 alone (not shown), or via networks 1524 and 1520. Each of computer memory 1506, data storage 1508, computer memory 1526, data storage 1528 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 1530 may be a router, a switch, a port, or other communication component such that a particular output of processor 1504 enables (or disables) input/output device 1530, which may be associated with network 1520 and/or network 1524, to allow (or disallow) communications between two or more nodes on network 1520 and/or network 1524. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components by, in one or more embodiments, voltages in memory circuits, configuration of switching circuits, and/or by selective use of particular logic gate circuits. Additionally or alternatively, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessors may be integrated into a single processing appliance (e.g., computer, server, blade, etc.) or located entirely, or in part, in a discrete component and connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMS, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, a first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A method, comprising:
accessing an application package comprising executable application code and a machine-readable manifest;
extracting the machine-readable manifest from the application package;
decoding the machine-readable manifest into an intermediate manifest;
matching a portion of the intermediate manifest to an object signature;
inserting, in the intermediate manifest, instrument code relative to the object signature to produce an instrumented manifest;
encoding the instrumented manifest into an instrumented machine-readable manifest;
extracting the executable application code from the application package;
processing the executable application code to identify an instrumentation signature,
wherein processing the executable application code includes decompiling the executable application code into a generated source code file;
inserting instrumentation code relative to the instrumentation signature to produce instrumented executable application code; and
packaging the instrumented executable application code and the instrumented machine-readable manifest into an instrumented application package.

2. The method of claim 1, wherein the executable application code comprises binary Dalvik bytecode (DEX).

3. The method of claim 1, wherein the generated source code file comprises Smali text.

4. The method of claim 1, further comprising inserting the instrumentation code in at least one of directly before or directly after an instrumentation signature, respectively.

5. The method of claim 1, wherein the machine-readable manifest comprises Android layout view (AXML) content.

6. The method of claim 1, wherein at least one of the intermediate manifest and the instrumented manifest comprise extensible markup language (XML) instructions.

7. The method of claim 1, wherein packaging the instrumented executable application code into the instrumented application package further comprises:

receiving a package type; and in response to the package type, packaging the instrumented executable application code into the instrumented application package having the package type.

8. The method of claim 7, wherein the package type is selected from a group comprising Android application bundle (AAB) or Android package kit (APK).

9. The method of claim 1, wherein extracting the executable application code from the application package further comprises extracting at least one of a resource or an asset from the application package.

10. The method of claim 9, wherein packaging the instrumented executable application code into the instrumented application package further comprises packaging the at least one of the resource or the asset in the instrumented application package.

11. A method, comprising:

accessing an application package comprising executable manifest;

extracting the executable manifest from the application package;

decoding the executable manifest into an intermediate manifest;

matching a portion of the intermediate manifest to an object signature;

inserting, in the intermediate manifest, in at least one of before the object signature and after the object signature an instrumentation code to produce an instrumented manifest;

encoding the instrumented manifest into an instrumented machine-readable manifest;

extracting an executable application code from the application package;

decompiling the executable application code into a generated source code file; and packaging the instrumented machine-readable manifest into an instrumented application package.

12. The method of claim 11, wherein the intermediate manifest comprises an Android manifest (AXML).

13. The method of claim 11, wherein the instrumented manifest comprises an extensible markup language (XML).

14. The method of claim 11, further comprising:

matching a portion of the generated source code file to an instrumentation signature;

inserting, in the generated source code file, in at least one of before the instrumentation signature and after the instrumentation signature, an instrumentation code to produce an instrumented source code;

compiling the instrumented source code into an instrumented executable application code; and packaging the instrumented executable application code into the instrumented application package.

15. The method of claim 14, wherein the executable application code comprises binary Dalvik bytecode (DEX).

16. The method of claim 14, wherein packaging the instrumented executable application code into the instrumented application package further comprises:

receiving a package type; and in response to the package type, packaging the instrumented executable application code into the instrumented application package having the package type.

17. The method of claim 16, wherein the package type is selected from a group comprising Android application bundle (AAB) or Android package kit (APK).

18. The method of claim 11, wherein the generated source code file comprises Smali text.

19. A system, comprising:

a data storage maintaining an application package comprising an executable manifest;

a processor coupled to a computer memory and having stored thereon instructions to cause the processor to:

access the application package from the data storage;

extract the executable manifest from the application package;

decode the executable manifest into an intermediate manifest;

match a portion of the intermediate manifest to an object signature;

insert, in the intermediate manifest in at least one of before the object signature and after the object signature, an instrumentation code to produce an instrumented manifest;

encode the instrumented manifest into an instrumented machine-readable manifest;

extract an executable application code from the application package;

decompile the executable application code into a generated source code file;

package the instrumented machine-readable manifest into an instrumented application package; and store the instrumented application package in the data storage.

20. The system of claim 19, wherein the intermediate manifest comprises an Android manifest (AXML) and the instrumented manifest comprises an extensible markup language (XML).

\* \* \* \* \*